(12) United States Patent
Tomioka (10) Patent No.: US 9,423,592 B2
(45) Date of Patent: Aug. 23, 2016

(54) IMAGING LENS AND IMAGING APPARATUS

(71) Applicant: FUJIFILM Corporation, Tokyo (JP)

(72) Inventor: Ukyo Tomioka, Saitama-Ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/741,480

(22) Filed: Jun. 17, 2015

(65) Prior Publication Data

US 2015/0293327 A1 Oct. 15, 2015

Related U.S. Application Data

(63) Continuation of application No. PCT/JP2013/007227, filed on Dec. 9, 2013.

(30) Foreign Application Priority Data

Dec. 21, 2012 (JP) ................. 2012-278808

(51) Int. Cl.
| | |
|---|---|
| *G02B 9/00* | (2006.01) |
| *G02B 9/64* | (2006.01) |
| *G02B 13/02* | (2006.01) |
| *G02B 13/16* | (2006.01) |
| *G02B 27/00* | (2006.01) |
| *G03B 3/00* | (2006.01) |
| *G02B 7/36* | (2006.01) |

(52) U.S. Cl.
CPC . *G02B 9/64* (2013.01); *G02B 7/36* (2013.01); *G02B 13/02* (2013.01); *G02B 13/16* (2013.01); *G02B 27/0025* (2013.01); *G03B 3/00* (2013.01)

(58) Field of Classification Search
CPC ...................................................... G02B 13/04
USPC ....................................................... 359/754
See application file for complete search history.

(56) References Cited

U.S. PATENT DOCUMENTS

| | | | | |
|---|---|---|---|---|
| 5,742,439 | A * | 4/1998 | Schuster | ............... G02B 13/00 359/749 |
| 6,445,511 | B1 | 9/2002 | Kitahara | |
| 2012/0081790 | A1 | 4/2012 | Yasui | |

FOREIGN PATENT DOCUMENTS

| | | |
|---|---|---|
| JP | 3-141313 | 6/1991 |
| JP | 9-159911 | 6/1997 |
| JP | 3084810 | 7/2000 |
| JP | 4624581 | 11/2010 |
| JP | 2012-78397 | 4/2012 |

OTHER PUBLICATIONS

International Search Report—PCT/JP2013/007227—Apr. 15, 2014.

* cited by examiner

*Primary Examiner* — James Jones
(74) *Attorney, Agent, or Firm* — Young & Thompson

(57) ABSTRACT

An imaging lens includes: a first lens group; a stop; a positive second lens group; and a negative third lens group which is fixed while focusing, in order from the object side. The first lens group includes at least one positive lens, at least one cemented lens, and a negative meniscus lens having a concave surface toward the image side, in order from the object side. The second lens group includes a cemented lens formed by a biconcave lens and a biconvex lens and a biconvex lens, in order from the object side. The third lens group includes a negative meniscus lens having a convex surface toward the object side, a biconcave lens, and a biconvex lens, in order from the object side. The first lens group, the stop, and the second lens group move integrally along the optical axis to focus from an infinite to a finite distance.

15 Claims, 7 Drawing Sheets

EXAMPLE 1

FIG.2 EXAMPLE 2

FIG.4 EXAMPLE 4

IMAGING LENS AND IMAGING APPARATUS

CROSS REFERENCE TO RELATED APPLICATIONS

The present application is a Continuation of PCT International Application No. PCT/JP2013/007227 filed on Dec. 9, 2013, which claims priority under 35 U.S.C. §119(a) to Japanese Patent Application No. 2012-278808 filed on Dec. 21, 2012. Each of the above applications is hereby expressly incorporated by reference, in its entirety, into the present application.

BACKGROUND OF THE INVENTION

1. Field of the Invention

The present invention is related to an imaging lens for use in electronic cameras such as a digital camera, a surveillance camera, and a cinematic camera. The present invention is also related to an imaging apparatus equipped with the imaging lens.

2. Description of the Related Art

There are known interchangeable imaging lenses for use in electronic cameras such as digital cameras, surveillance cameras, and cinematic cameras, constituted by a first lens group having a positive refractive power, a second lens group having a negative refractive power, and a third lens group having a positive refractive power provided in this order from the object side, in which the second lens group is moved during focusing operations, as disclosed in Japanese Patent No. 3084810, Japanese Patent No. 4624581, and Japanese Unexamined Patent Publication No. 9(1997)-159911.

DISCLOSURE OF THE INVENTION

Meanwhile, there is demand for an imaging lens that favorably corrects various aberrations, accompanying improvements in resolution of recent electronic cameras such as digital cameras and cinematic cameras. In addition, there is increasing demand for an imaging lens having a small F number, a so called bright lens. However, the F number of the imaging lenses disclosed in Japanese Patent Nos. 3084810 and 4624581 are large, and these imaging lenses do not satisfy the demand for a bright imaging lens. In addition, although the imaging lens disclosed in Japanese Unexamined Patent Publication No. 9(1997)-159911 has a small F number, correction of astigmatism, field curvature, and longitudinal chromatic aberration is insufficient, and this imaging lens does not satisfy the demand accompanying the improvements in resolution.

The present invention has been developed in view of the foregoing circumstances. It is an object of the present invention to provide an imaging lens having a small F number, in which various aberrations are favorably corrected. It is another object of the present invention to provide an imaging apparatus equipped with such an imaging lens.

An imaging lens of the present invention consists of
a first lens group;
a stop;
a second lens group having a positive refractive power; and
a third lens group having a negative refractive power which is fixed during focusing operations, provided in this order from the object side;
the first lens group consisting of at least one lens having a positive refractive power, at least one cemented lens, and a negative meniscus lens having a concave surface toward the image side, provided in this order from the object side;
the second lens group consisting of a cemented lens formed by a biconcave lens and a biconvex lens and a biconvex lens, provided in this order from the object side;
the third lens group consisting of a negative meniscus lens having a convex surface toward the object side, a biconcave lens, and a biconvex lens, provided in this order from the object side;
the first lens group, the stop, and the second lens group being moved integrally along the optical axis to perform focusing from an infinite distance to a finite distance.

The imaging lens of the present invention consists of the first lens group, the stop, the second lens group, and the third lens group. However, the imaging lens of the present invention may also include lenses having no practical power, optical elements other than lenses such as a cover glass, and mechanical components such as lens flanges, a lens barrel, an imaging element, and a camera shape correcting mechanism.

In addition, the surface shapes of lenses such as convex, concave, planar, biconcave, meniscus, biconvex, planoconvex, and planoconcave, as well as the positive and negative signs of the refractive powers of lenses are considered in the paraxial region for lenses that include aspherical surfaces in the present invention. In addition, the signs of radii of curvature are positive in the case that a surface shape has a convex surface toward the object side, and negative in the case that a surface shape has a convex surface toward the image side.

Note that it is preferable for the imaging lens of the present invention to satisfy Conditional Formula (1) below:

$$0.65 < f12/f < 0.90 \quad (1)$$

wherein f12 is the combined focal length of the first lens group and the second lens group, and f is the focal length of the entire system.

In addition, it is preferable for the imaging lens of the present invention to satisfy Conditional Formula (2) below:

$$1.00 < f1/f2 < 2.50 \quad (2)$$

wherein f1 is the focal length of the first lens group, and f2 is the focal length of the second lens group.

In addition, it is preferable for the imaging lens of the present invention to satisfy Conditional Formula (3) below:

$$0.15 < (R3mf - R3mr)/(R3mf + R3mr) < 0.50 \quad (3)$$

wherein R3mf is the radius of curvature of the surface of the negative meniscus lens within the third lens group toward the object side, and R3mr is the radius of curvature of the surface of the negative meniscus lens within the third lens group toward the image side.

In addition, it is preferable for the imaging lens of the present invention to satisfy Conditional Formula (4) below:

$$0.10 < (R1mf - R1mr)/(R1mf + R1mr) < 0.30 \quad (4)$$

wherein R1mf is the radius of curvature of the surface of the negative meniscus lens within the first lens group toward the object side, and R1mr is the radius of curvature of the surface of the negative meniscus lens within the first lens group toward the image side.

In addition, in the imaging lens of the present invention, it is preferable for a cemented lens formed by a lens having a negative refractive power and a concave surface toward the image side and a lens having a positive refractive power and a convex surface toward the object side to be positioned at the object side of the negative meniscus lens within the first lens group with an air interval therebetween.

In addition, it is preferable for the imaging lens of the present invention to satisfy Conditional Formula (5) below:

$$1.0 < R2pf/D2p < 3.5 \qquad (5)$$

wherein R2pf is the radius of curvature of the surface of the biconvex lens that constitutes the cemented lens within the second lens group toward the object side, and D2p is the thickness of the center of the biconvex lens that constitutes the cemented lens within the second lens group.

In addition, it is preferable for the imaging lens of the present invention to satisfy Conditional Formula (6) below:

$$nd3n < 1.60 \qquad (6)$$

wherein nd3n is the refractive index of the biconcave lens within the third lens group with respect to the d line.

In addition, it is preferable for the imaging lens of the present invention to satisfy at least one of Conditional Formulae (1-1), (2-1), (3-1), (4-1), (5-1), and (6-1) below:

$$0.72 < f12/f < 0.85 \qquad (1\text{-}1)$$

$$1.15 < f1/f2 < 2.10 \qquad (2\text{-}1)$$

$$0.20 < (R3mf-R3mr)/(R3mf+R3mr) < 0.36 \qquad (3\text{-}1)$$

$$0.14 < (R1mf-R1mr)/(R1mf+R1mr) < 0.23 \qquad (4\text{-}1)$$

$$1.6 < R2pf/D2p < 2.8 \qquad (5\text{-}1)$$

$$nd3n < 1.53 \qquad (6\text{-}1)$$

An imaging apparatus of the present invention is characterized by being equipped with the imaging lens of the present invention described above.

The imaging lens according to the present invention comprises the first lens group, the stop, and the second lens group having a positive refractive power, provided in this order from the object side. The first lens group consists of at least one lens having a positive refractive power, at least one cemented lens, and a negative meniscus lens having a concave surface toward the image side, provided in this order from the object side. The second lens group consists of a cemented lens formed by a biconcave lens and a biconvex lens and a biconvex lens, provided in this order from the object side. Therefore, a bright optical system can be realized, while spherical aberration and longitudinal chromatic aberration can be favorably corrected. In addition, increases in spherical aberration, astigmatism, and field curvature can be prevented, because the first lens group includes a negative meniscus lens.

In addition, the third lens group having a negative refractive power, which is fixed during focusing operations, is positioned at the image side of the second lens group. The third lens group consists of a negative meniscus lens having a convex surface toward the object side, a biconcave lens, and a biconvex lens, provided in this order from the object side. Therefore, variations in field curvature accompanying focusing operations can be favorably corrected.

The imaging apparatus of the present invention is equipped with the imaging lens of the present invention. Therefore, the imaging apparatus can be configured to have high performance, and is capable of obtaining high resolution images using an imaging element.

BRIEF DESCRIPTION OF THE DRAWINGS

A through D of FIG. 5 are diagrams that illustrate aberrations of the imaging lens of Example 1.

A through D of FIG. 6 are diagrams that illustrate aberrations of the imaging lens of Example 2.

A through D of FIG. 7 are diagrams that illustrate aberrations of the imaging lens of Example 3.

A through D of FIG. 8 are diagrams that illustrate aberrations of the imaging lens of Example 4.

BEST MODE FOR CARRYING OUT THE INVENTION

Figure 1:
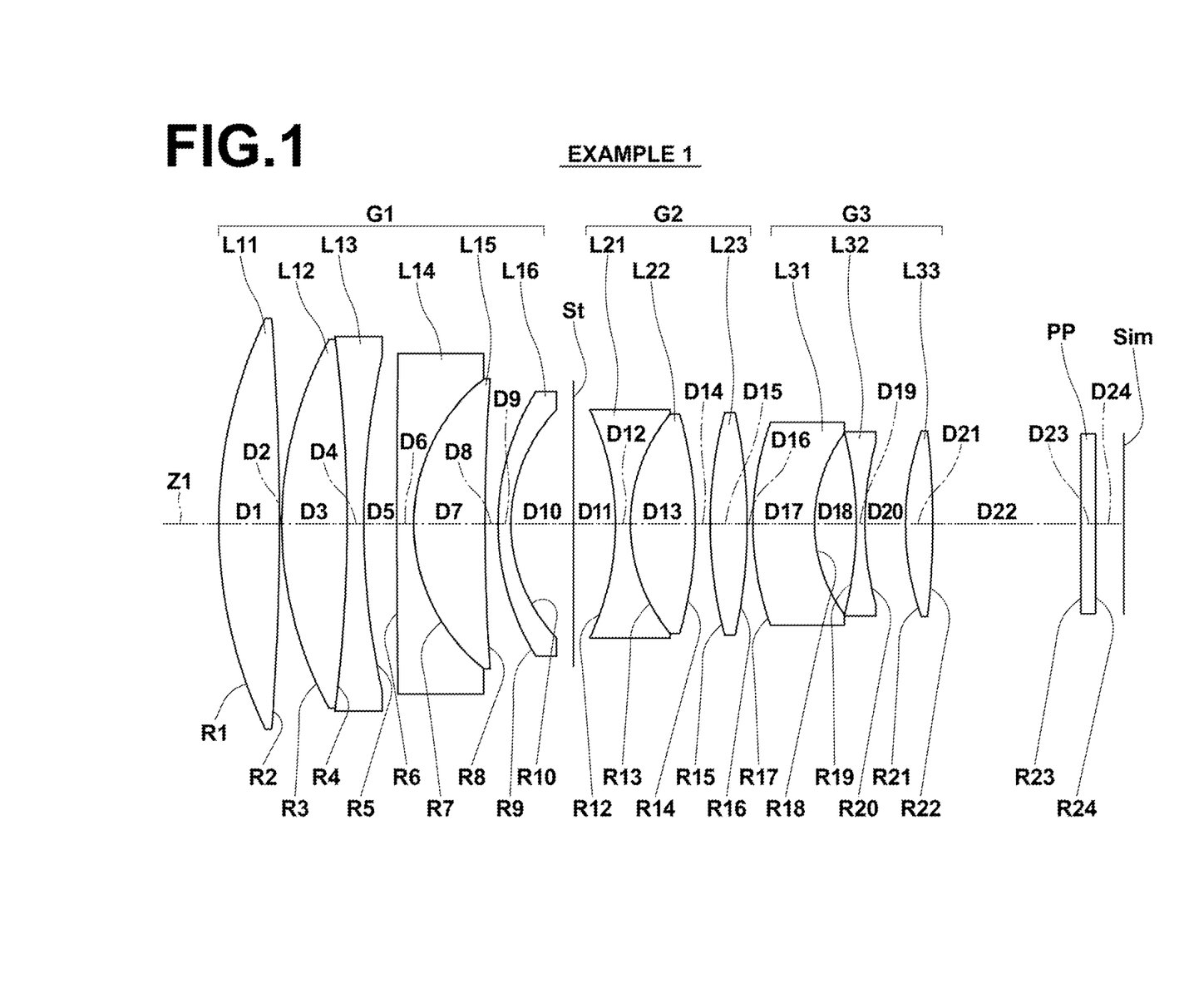
FIG. 1 is a sectional diagram that illustrates the lens configuration of an imaging lens according to Example 1 of the present invention.
Figure 2:
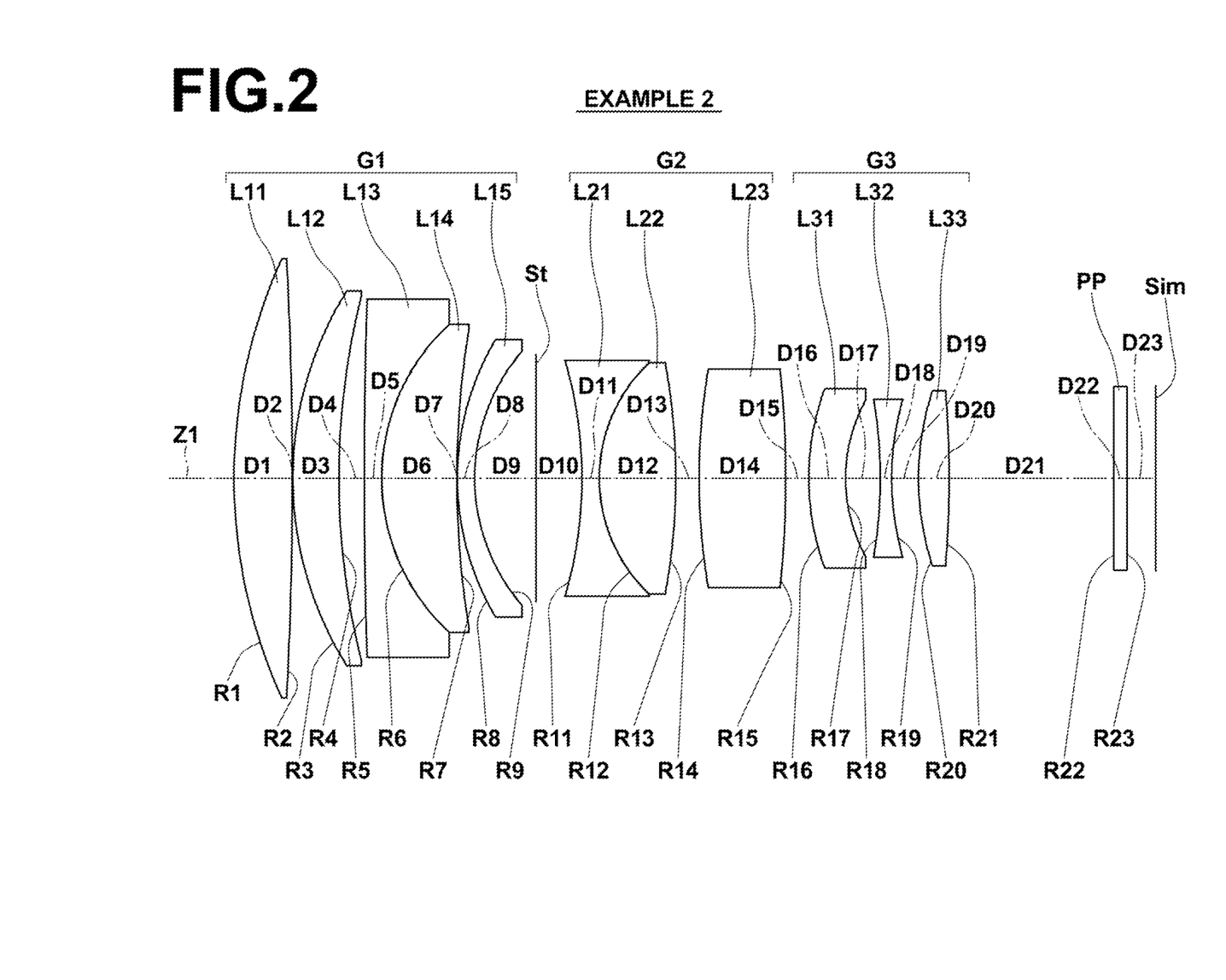
FIG. 2 is a sectional diagram that illustrates the lens configuration of an imaging lens according to Example 2 of the present invention.
Figure 3:
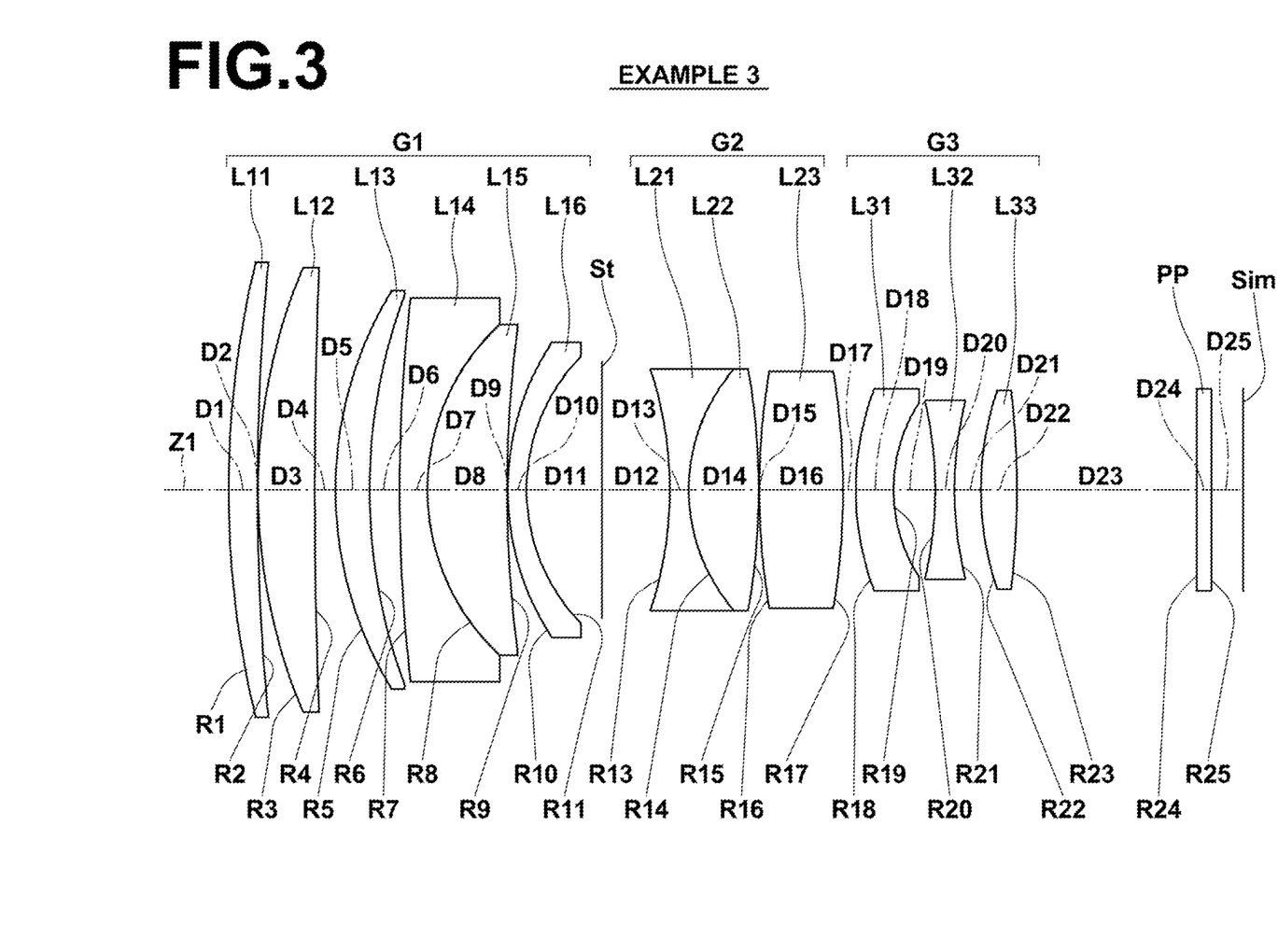
FIG. 3 is a sectional diagram that illustrates the lens configuration of an imaging lens according to Example 3 of the present invention.
Figure 4:
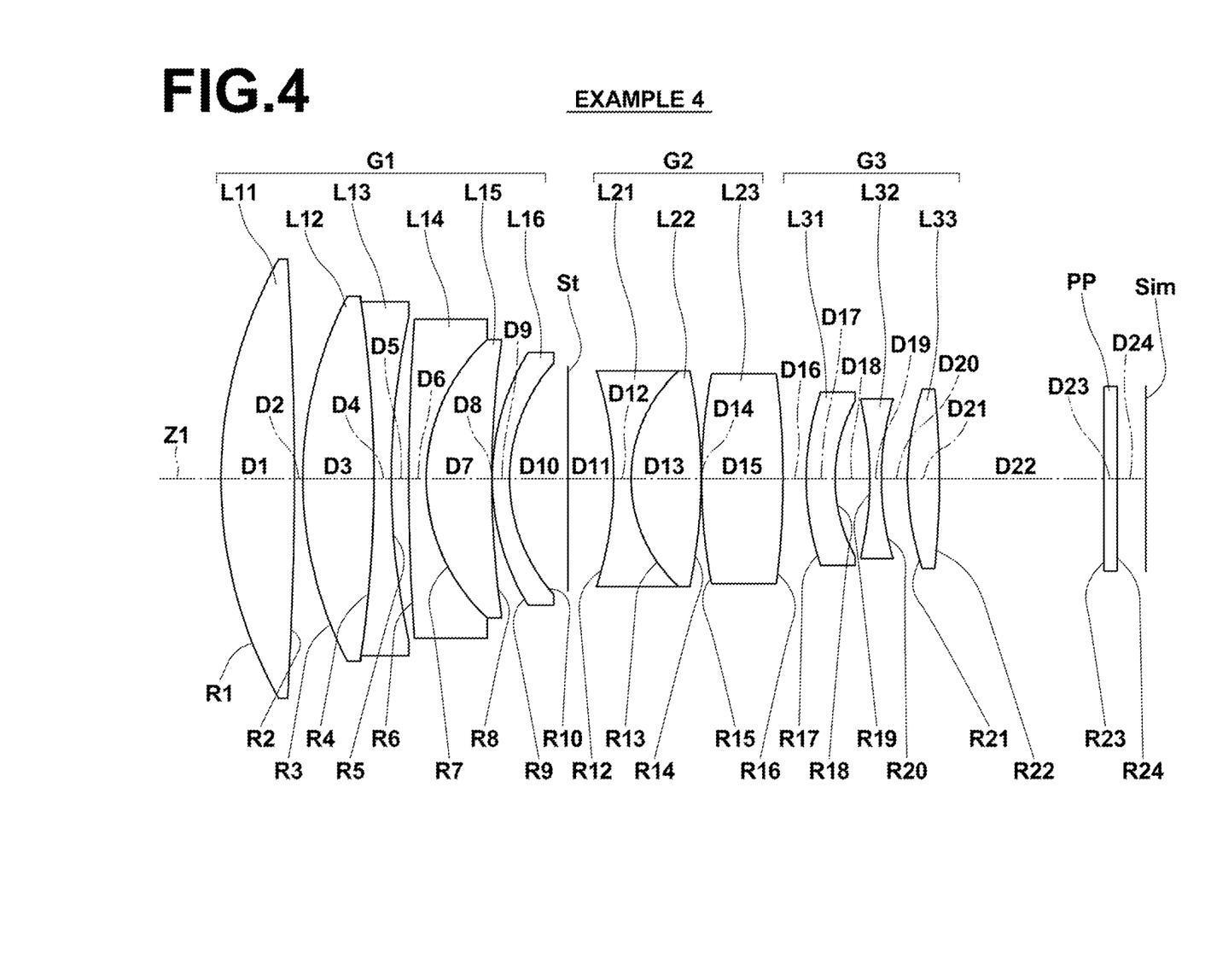
FIG. 4 is a sectional diagram that illustrates the lens configuration of an imaging lens according to Example 4 of the present invention.

Hereinafter, embodiments of the present invention will be described in detail with reference to the attached drawings. FIG. 1 is a sectional diagram that illustrates the configuration of an imaging lens according to an embodiment of the present invention, which corresponds to an imaging lens of Example 1 to be described later. FIG. 2 through FIG. 4 are sectional diagrams that illustrate the configurations of imaging lenses according to other embodiments of the present invention that corresponds to imaging lenses of Examples 2 through 4 to be described later. The basic configurations of the examples illustrated in FIG. 1 through FIG. 4 and the manner in which they are illustrated are substantially the same. Therefore, here, the imaging lenses according to the embodiments of the present invention will be described mainly with reference to FIG. 1.

FIG. 1 illustrates the arrangement of the optical system in a state focused on an object at infinity, with the left side being the object side and the right side being the image side. The same applies to FIG. 2 through FIG. 4, to be described later.

The imaging lens of the present embodiment is constituted by a first lens group G1, a second lens group G2, and a third lens group G3, provided as lens groups in this order from the object side. Note that an aperture stop St is provided between the first lens group G1 and the second lens group G2. The second lens group G2 has a positive refractive power, and the third lens group G3 has a negative refractive power. The first lens group G1 may have a positive refractive power.

The first lens group G1 is constituted by at least one lens having a positive refractive index, at least one cemented lens, and a negative meniscus lens having a concave surface toward the image side, provided in this order from the object side. In addition, it is preferable for a cemented lens formed by a lens having a negative refractive power and a concave surface toward the image side and a lens having a positive refractive power and a convex surface toward the object side to be positioned at the object side of the negative meniscus lens within the first lens group with an air interval therebetween. In the present embodiment, the first lens group G1 is constituted by six lenses, which are: a positive first group first lens L11, a cemented lens formed by a biconvex first group second lens L12 and a biconcave first group third lens L13, a cemented lens formed by a negative first group fourth lens L14 having a concave surface toward the image side and a positive first group fifth lens L15 having a convex surface toward the object side, and a first group sixth lens L16, which is a negative meniscus lens having a concave surface toward the image side, provided in this order from the object side.

Note that in Example 2 to be described later, the first lens group G1 is constituted by five lenses, which are: a positive first group first lens L11, a first group second lens L12, which is a positive meniscus lens having a convex surface toward the object side, a cemented lens formed by a negative first group third lens L13 having a concave surface toward the image side and a positive first group fourth lens L14 having a convex surface toward the object side, and a first group fifth lens L15, which is a negative meniscus lens having a concave surface toward the image side, provided in this order from the object side. In Example 3, the first lens group G1 is constituted by six lenses, which are: a first group first lens L11, which is a positive meniscus lens having a convex surface toward the object side, a first group second lens L12, which is a positive meniscus lens having a convex surface toward the object side, a first group third lens L13, which is a positive meniscus lens having a convex surface toward the object side, a cemented lens formed by a negative first group fourth lens L14 having a concave surface toward the image side and a positive first group fifth lens L15 having a convex surface toward the object side, and a first group sixth lens L16, which is a negative meniscus lens having a concave surface toward the image side, provided in this order from the object side. The first lens group G1 of Example 4 has the same lens configuration as that of Example 1.

The second lens group G2 is constituted by three lenses, which are a cemented lens formed by a biconcave lens and a biconvex lens, and a biconvex lens, provided in this order from the object side. In the present embodiment, the second lens group G2 is constituted by three lenses, which are: a cemented lens formed by a biconcave second group first lens L21 and a biconvex second group second lens L22, and a biconvex second group third lens L23, provided in this order from the object side. Note that the second lens groups G2 of Examples 2 through 4 to be described later have the same configuration as that of Example 1.

The third lens group G3 is constituted by three lenses, which are a negative meniscus lens having a convex surface toward the object side, a biconcave lens, and a biconvex lens, provided in this order from the object side. In the present embodiment, the third lens group G3 is constituted by three lenses, which are: a third group first lens L31, which is a negative meniscus lens having a convex surface toward the object side, a third group second lens L32, which is a biconcave lens, and a third group third lens L33, which is a biconvex lens, provided in this order from the object side. Note that the second lens groups G3 of Examples 2 through 4 to be described later have the same configuration as that of Example 1.

Note that the aperture stop St illustrated in FIG. 1 does not necessarily represent the size or the shape thereof, but the position thereof along the optical axis Z. In addition Sim illustrated in FIG. 1 is an image formation plane. An imaging element such as a CCD (Charge Coupled Device) and a CMOS (Complementary Metal Oxide Semiconductor) is provided at this position, as will be described later.

In addition, FIG. 1 illustrates an example in which a plane parallel plate shaped optical member PP is provided between the third lens group G3 and the image formation plane Sim. When this imaging lens is applied to an imaging apparatus, it is often the case that a cover glass and various filters, such as an infrared cutoff filter and a low pass filter, are provided between the optical system and an image formation plane Sim, depending on the configuration of the camera to which the lens is mounted. The plane parallel plate shaped optical member PP presumes such a cover glass and filters.

Note that in the imaging lens of the present embodiment, focusing operations are performed by moving the first lens group G1, the stop St, and the second lens group G2 integrally along the optical axis Z, while the third lens group G3 is fixed.

The imaging lens of the present embodiment comprises the first lens group G1, the stop St, and the second lens group G2 having a positive refractive power, provided in this order from the object side. The first lens group G1 consists of at least one lens having a positive refractive power, at least one cemented lens, and a negative meniscus lens having a concave surface toward the image side, provided in this order from the object side. The second lens group G2 consists of a cemented lens formed by a biconcave lens and a biconvex lens and a biconvex lens, provided in this order from the object side. Therefore, a bright optical system having an F number of approximately 1.9 can be realized, while spherical aberration and longitudinal chromatic aberration can be favorably corrected. In addition, increases in spherical aberration, astigmatism, and field curvature can be prevented, because the first lens group G1 includes a negative meniscus lens.

In addition, a cemented lens formed by a lens having a negative refractive power and a concave surface toward the image side and a lens having a positive refractive power and a convex surface toward the object side is positioned at the object side of the negative meniscus lens within the first lens group G1 with an air interval therebetween. Therefore, the generation of higher order spherical aberration can be suppressed, while longitudinal chromatic aberration can be favorably corrected.

In addition, the third lens group G3 having a negative refractive power, which is fixed during focusing operations, is positioned at the image side of the second lens group G2. The third lens group G3 consists of a negative meniscus lens having a convex surface toward the object side, a biconcave lens, and a biconvex lens, provided in this order from the object side. Therefore, variations in field curvature accompanying focusing operations can be favorably corrected.

Next, configurations which are preferable for the imaging lens according to the embodiment of the present invention to have will be described. Note that the imaging lens of the embodiment may have any one of the configurations below, or combinations of two or more of the configurations, as a preferred aspect of the present invention.

It is preferable for the combined focal length of the first lens group G1 and the second lens group G2 to satisfy Conditional Formula (1) below:

$$0.65 < f12/f < 0.90 \tag{1}$$

wherein f12 is the combined focal length of the first lens group and the second lens group, and f is the focal length of the entire system.

If the value of f12/f is less than the lower limit defined in Conditional Formula (1), the positive refractive power of a combined lens group constituted by the first lens group G1 and the second lens group G2 will increase, and spherical aberration will be insufficiently corrected. If the value of f12/f is greater than the upper limit defined in Conditional Formula (1), the total length of the imaging lens will increase.

The above effects will become more prominent by the imaging lens of the present embodiment satisfying Conditional Formula (1-1) within the range defined by Conditional Formula (1).

$$0.72 < f12/f < 0.85 \quad (1\text{-}1)$$

It is preferable for the focal lengths of the first lens group G1 and the second lens group G2 to satisfy Conditional Formula (2) below:

$$1.00 < f1/f2 < 2.50 \quad (2)$$

wherein f1 is the focal length of the first lens group, and f2 is the focal length of the second lens group.

If the value of f1/f2 is less than the lower limit defined in Conditional Formula (2), the positive refractive power of the first lens group G1 will increase, and spherical aberration will be insufficiently corrected. If the value of f1/f2 is greater than the upper limit defined in Conditional Formula (2), the total length of the imaging lens will increase.

The above effects will become more prominent by the imaging lens of the present embodiment satisfying Conditional Formula (2-1) within the range defined by Conditional Formula (2).

$$1.15 < f1/f2 < 2.10 \quad (2\text{-}1)$$

It is preferable for the negative meniscus lens within the third lens group G3 to satisfy Conditional Formula (3) below:

$$0.15 < (R3mf - R3mr)/(R3mf + R3mr) < 0.50 \quad (3)$$

wherein R3mf is the radius of curvature of the surface of the negative meniscus lens within the third lens group toward the object side, and R3mr is the radius of curvature of the surface of the negative meniscus lens within the third lens group toward the image side.

If the value of (R3mf−R3mr)/(R3mf+R3mr) is less than the lower limit defined in Conditional Formula (3) or greater than the upper limit defined in Conditional Formula (3), spherical aberration, astigmatism, and field curvature will increase.

The above effects will become more prominent by the imaging lens of the present embodiment satisfying Conditional Formula (3-1) within the range defined by Conditional Formula (3).

$$0.20 < (R3 - R3mr)/(R3mf + R3mr) < 0.36 \quad (3\text{-}1)$$

It is preferable for the negative meniscus lens within the first lens group G1 to satisfy Conditional Formula (4) below:

$$0.10 < (R1mf - R1mr)/(R1mf + R1mr) < 0.30 \quad (4)$$

wherein R1mf is the radius of curvature of the surface of the negative meniscus lens within the first lens group toward the object side, and R1mr is the radius of curvature of the surface of the negative meniscus lens within the first lens group toward the image side.

If the value of (R1mf−R1mr)/(R1mf+R1mr) is less than the lower limit defined in Conditional Formula (4) or greater than the upper limit defined in Conditional Formula (4), spherical aberration, astigmatism, and field curvature will increase.

The above effects will become more prominent by the imaging lens of the present embodiment satisfying Conditional Formula (4-1) within the range defined by Conditional Formula (4).

$$0.14 < (R1mf - R1mr)/(R1mf + R1mr) < 0.23 \quad (4\text{-}1)$$

It is preferable for the biconvex lens that constitutes the cemented lens within the second lens group G2 to satisfy Conditional Formula (5) below:

$$1.0 < R2pf/D2p < 3.5 \quad (5)$$

wherein R2pf is the radius of curvature of the surface of the biconvex lens that constitutes the cemented lens within the second lens group toward the object side, and D2p is the thickness of the center of the biconvex lens that constitutes the cemented lens within the second lens group.

If the value of R2pf/D2p is less than the lower limit defined in Conditional Formula (5), the radius of curvature of the joint surface of the cemented lens will be excessively small, resulting in higher order spherical aberration being generated. If the value of R2pf/D2p is greater than the upper limit defined in Conditional Formula (5), the color erasing effect at the joint surface of the cemented lens will become weak, resulting in longitudinal chromatic aberration increasing.

The above effects will become more prominent by the imaging lens of the present embodiment satisfying Conditional Formula (5-1) within the range defined by Conditional Formula (5).

$$1.6 < R2pf/D2p < 2.8 \quad (5\text{-}1)$$

It is preferable for the refractive index of the biconcave lens within the third lens group with respect to the d line to satisfy Conditional Formula (6) below:

$$nd3n < 1.60 \quad (6)$$

wherein nd3n is the refractive index of the biconcave lens within the third lens group with respect to the d line.

If the value of nd3n is greater than the upper limit defined in Conditional Formula (6), the Petzval sum will increase, resulting in field curvature being generated.

The above effects will become more prominent by the imaging lens of the present embodiment satisfying Conditional Formula (6-1) within the range defined by Conditional Formula (6).

$$nd3n < 1.53 \quad (6\text{-}1)$$

EXAMPLES

Next, the embodiments of the imaging lens of the present invention will be described in detail, mainly in connection with examples of numerical values.

Example 1

The arrangement of lens groups in the imaging lens of Example 1 is illustrated in FIG. 1. Note that a detailed description of the lens groups and each of the lenses has been given above. Therefore, redundant descriptions will be omitted below unless particularly necessary.

Basic lens data of the imaging lens of Example 1 are shown in Table 1, and data related to various other items are shown in Table 2. Similarly, basic lens data and data related to other various items for Examples 2 through 4 are shown in Table 3 through Table 8. In the following description, the meanings of the symbols in the tables will be described for Example 1. The meanings of the symbols are basically the same for Examples 2 through 7. Note that the numerical values of the data shown in Tables 1 through 8 are normalized such that the focal length of the entire system is 100.

In the basic lens data of Table 1, ith (i=1, 2, 3, . . . ) lens surface numbers that sequentially increase from the object side to the image side, with the lens surface at the most object side designated as first, are shown in the column Si. The radii of curvature of ith surfaces are shown in the column Ri, and the distances between an ith surface and an i+1st surface along the optical axis Z are shown in the column Di. Note that the signs of the radii of curvature are positive in cases that the surface shape is convex toward the object side, and negative in cases that the surface shape is convex toward the image side.

In addition, in the basic lens data, the refractive indices of jth (j=1, 2, 3, . . . ) optical elements that sequentially increase from the object side to the image side, with the optical element at the most object side designated as first, with respect to the d line (wavelength: 587.6 nm) are shown in the column ndj. The Abbe's numbers of the jth optical element with respect to the d line are shown in the column vdj. The aperture stop St and the optical member PP are also included in the basic lens data. Text reading "(stop)" is indicated along with a surface number in the column of the surface numbers at the surface corresponding to the aperture stop.

Table 2 shows the values of the focal length f' of the entire system, the back focus (air converted length) Bf', the F number (FNo.), and the angles of view (2ω)) in a state focused on an object at infinity, as the data related to various other items.

The manners in which the data of Table 1 and Table 2 are shown as described above are also the same for Tables 3 through 8 to be described later.

In the tables below, degrees)(°) are used as the units for angles. However, it is possible for optical systems to be proportionately enlarged or proportionately reduced and utilized. Therefore, other appropriate units may be used.

TABLE 1

Example 1: Basic Lens Data

| Si | Ri | Di | ndj | vdj |
|---|---|---|---|---|
| 1 | 62.5564 | 8.00 | 1.58913 | 61.14 |
| 2 | −353.1144 | 0.30 | | |
| 3 | 50.3779 | 8.60 | 1.49700 | 81.54 |
| 4 | −190.8274 | 2.21 | 1.71299 | 53.87 |
| 5 | 100.6451 | 4.37 | | |
| 6 | 1758.5215 | 2.22 | 1.51742 | 52.43 |
| 7 | 24.2843 | 9.40 | 1.49700 | 81.54 |
| 8 | 272.0234 | 1.71 | | |
| 9 | 32.8432 | 1.70 | 1.51742 | 52.43 |
| 10 | 21.7228 | 8.21 | | |
| 11 (stop) | ∞ | 5.58 | | |
| 12 | −34.7794 | 1.96 | 1.48749 | 70.45 |
| 13 | 22.4549 | 8.55 | 1.49700 | 81.54 |
| 14 | −51.5312 | 1.96 | | |
| 15 | 57.2476 | 4.89 | 1.51633 | 64.14 |
| 16 | −67.3657 | 0.74 | | |
| 17 | 39.1910 | 8.13 | 1.85026 | 32.27 |
| 18 | 20.1195 | 5.48 | | |
| 19 | −47.7619 | 1.16 | 1.43875 | 94.93 |
| 20 | 40.6835 | 5.34 | | |
| 21 | 36.5819 | 3.60 | 1.72916 | 54.68 |
| 22 | −106.1727 | 19.53 | | |
| 23 | ∞ | 1.93 | 1.51633 | 64.14 |
| 24 | ∞ | 4.39 | | |

TABLE 2

Example 1: Other Data

| f | 100.00 |
|---|---|
| Bf | 24.52 |
| FNo. | 1.91 |
| 2ω (°) | 13.4 |

Figure 5:
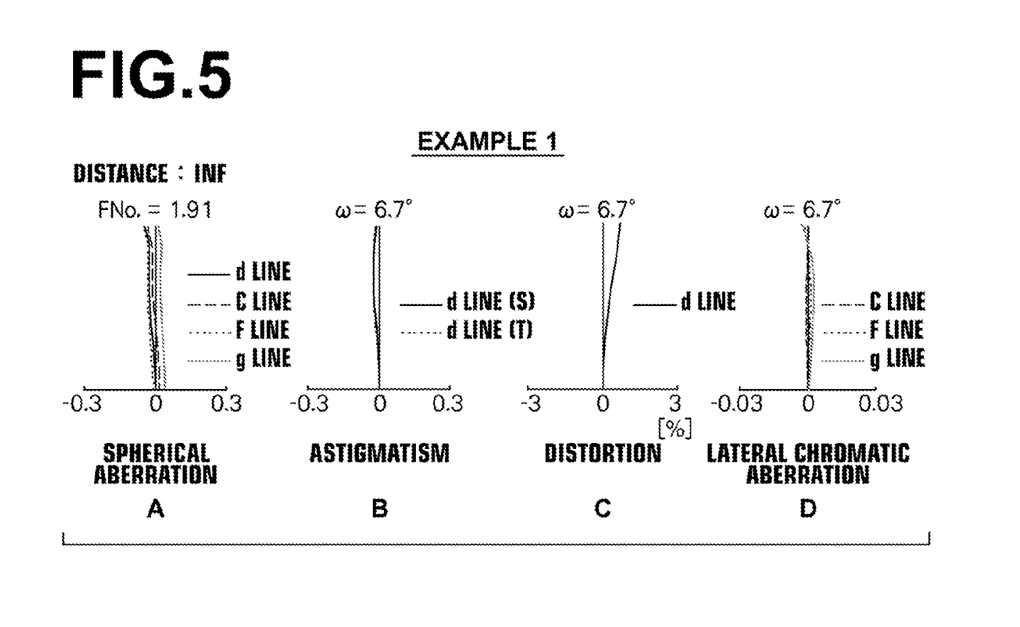

Here, the spherical aberration, the astigmatic aberration, the distortion, and the lateral chromatic aberration of the imaging lens of Example 1 at the wide angle end are illustrated in A through D of FIG. 5, respectively. The diagrams that illustrate various aberrations show aberrations related to the d line (wavelength: 587.6 nm). The diagrams that illustrate spherical aberration also show aberrations related to the C line (wavelength: 656.3 nm), aberrations related to the F line (wavelength: 486.1 nm), and aberrations related to the g line (wavelength: 436 nm). Particularly, the diagrams that illustrate lateral chromatic aberration, aberrations related to the C line (wavelength: 656.3 nm), aberrations related to the F line (wavelength: 486.1 nm), and aberrations related to the g line (wavelength: 436 nm). In the diagrams that illustrate astigmatic aberrations, aberrations in the sagittal direction are indicated by solid lines, while aberrations in the tangential direction are indicated by dotted lines. In the diagrams that illustrate spherical aberrations, "FNo." denotes F numbers. In the other diagrams that illustrate the aberrations, "ω" denotes half angles of view. The manners in which the variations are shown also apply to FIG. 6 through FIG. 8 to be described later.

Example 2

The arrangement of lens groups in the imaging lens of Example 2 is illustrated in FIG. 2. The imaging lens of Example 2 has substantially the same configuration as the imaging lens of Example 1 described above. However, the imaging lens of Example 2 differs from the imaging lens of Example 1 in that the first lens group G1 is constituted by five lenses, which are: a positive first group first lens L11, a first group second lens L12, which is a positive meniscus lens having a convex surface toward the object side, a cemented lens formed by a negative first group third lens L13 having a concave surface toward the image side and a positive first group fourth lens L14 having a convex surface toward the object side, and a first group fifth lens L15, which is a negative meniscus lens having a concave surface toward the image side, provided in this order from the object side.

Figure 6:
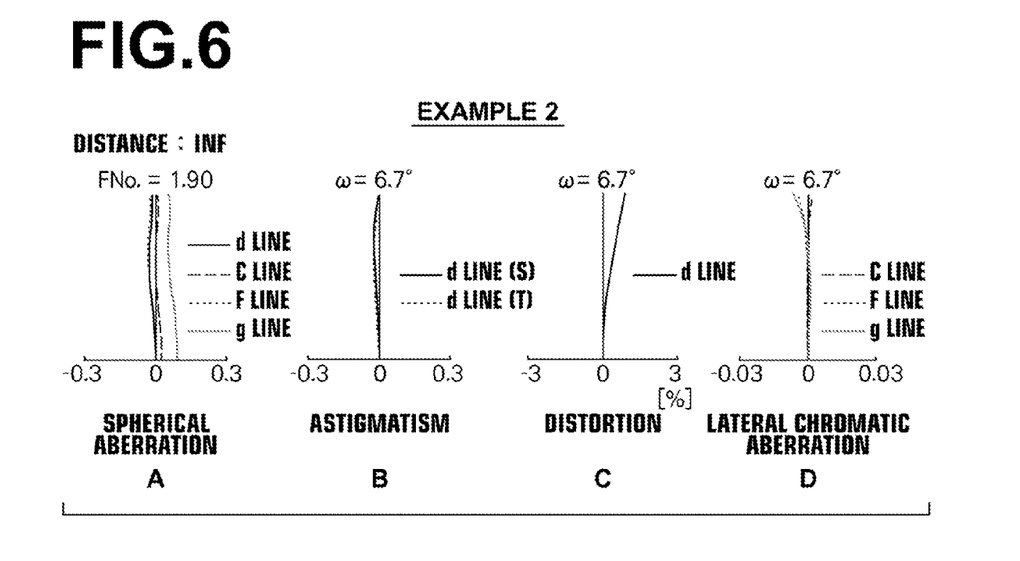

Table 3 shows basic lens data of the imaging lens of Example 2. Table 4 shows various other data of the imaging lens of Example 2. A through D of FIG. 6 are diagrams that illustrate various aberrations of the imaging lens of Example 2.

TABLE 3

Example 2: Basic Lens Data

| Si | Ri | Di | ndj | vdj |
|---|---|---|---|---|
| 1 | 68.0017 | 7.47 | 1.58913 | 61.14 |
| 2 | −552.9237 | 0.07 | | |
| 3 | 45.1294 | 5.92 | 1.49700 | 81.54 |
| 4 | 95.9944 | 3.24 | | |
| 5 | 703.2845 | 2.26 | 1.51742 | 52.43 |
| 6 | 26.8669 | 9.65 | 1.49700 | 81.54 |
| 7 | 118.4600 | 0.07 | | |
| 8 | 34.6741 | 2.23 | 1.63980 | 34.46 |

TABLE 3-continued

Example 2: Basic Lens Data

| Si | Ri | Di | ndj | vdj |
|---|---|---|---|---|
| 9 | 24.9221 | 7.88 | | |
| 10 (stop) | ∞ | 5.89 | | |
| 11 | −53.819 | 02.24 | 1.48749 | 70.23 |
| 12 | 20.4388 | 9.82 | 1.49700 | 81.54 |
| 13 | −81.5480 | 2.99 | | |
| 14 | 83.2590 | 11.13 | 1.58913 | 61.14 |
| 15 | −133.8019 | 2.97 | | |
| 16 | 33.4093 | 4.72 | 1.92286 | 20.88 |
| 17 | 20.8144 | 4.45 | | |
| 18 | −61.3653 | 1.48 | 1.49700 | 81.54 |
| 19 | 36.7624 | 3.43 | | |
| 20 | 35.5866 | 3.94 | 1.80440 | 39.59 |
| 21 | −140.2811 | 21.14 | | |
| 22 | ∞ | 1.71 | 1.51633 | 64.14 |
| 23 | ∞ | 3.68 | | |

TABLE 4

Example 2: Other Data

| | |
|---|---|
| f | 100.00 |
| Bf | 25.95 |
| FNo. | 1.90 |
| 2ω (°) | 13.4 |

Example 3

The arrangement of lens groups in the imaging lens of Example 3 is illustrated in FIG. 3. The imaging lens of Example 3 has substantially the same configuration as the imaging lens of Example 1 described above. However, the imaging lens of Example 3 differs from the imaging lens of Example 1 in that the first lens group G1 is constituted by six lenses, which are: a first group first lens L11, which is a positive meniscus lens having a convex surface toward the object side, a first group second lens L12, which is a positive meniscus lens having a convex surface toward the object side, a first group third lens L13, which is a positive meniscus lens having a convex surface toward the object side, a cemented lens formed by a negative first group fourth lens L14 having a concave surface toward the image side and a positive first group fifth lens L15 having a convex surface toward the object side, and a first group sixth lens L16, which is a negative meniscus lens having a concave surface toward the image side, provided in this order from the object side.

Figure 7:
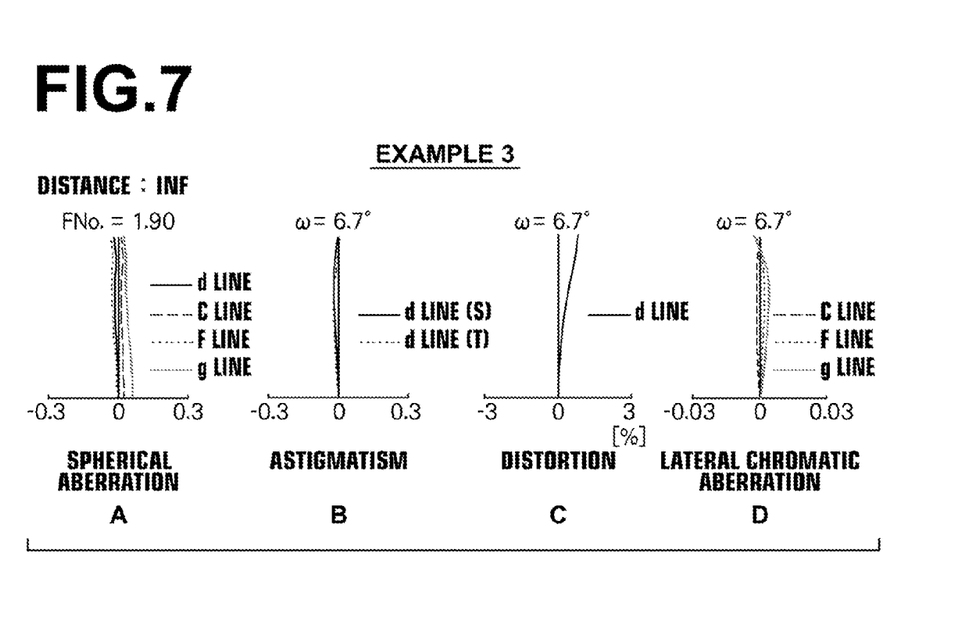

Table 5 shows basic lens data of the imaging lens of Example 3. Table 6 shows various other data of the imaging lens of Example 3. A through D of FIG. 7 are diagrams that illustrate various aberrations of the imaging lens of Example 3.

TABLE 5

Example 3: Basic Lens Data

| Si | Ri | Di | ndj | vdj |
|---|---|---|---|---|
| 1 | 112.6204 | 3.40 | 1.54671 | 67.50 |
| 2 | 276.9647 | 0.07 | | |
| 3 | 66.7247 | 6.64 | 1.49700 | 81.54 |
| 4 | 638.4034 | 2.45 | | |
| 5 | 44.5807 | 4.00 | 1.54930 | 64.42 |
| 6 | 65.5622 | 3.53 | | |
| 7 | 196.5022 | 3.26 | 1.51000 | 53.26 |

TABLE 5-continued

Example 3: Basic Lens Data

| Si | Ri | Di | ndj | vdj |
|---|---|---|---|---|
| 8 | 26.3620 | 9.36 | 1.49700 | 81.54 |
| 9 | 146.5208 | 0.07 | | |
| 10 | 31.4791 | 2.22 | 1.55291 | 45.08 |
| 11 | 22.4484 | 8.87 | | |
| 12 (stop) | ∞ | 7.93 | | |
| 13 | −45.1027 | 2.23 | 1.47999 | 61.90 |
| 14 | 21.4086 | 8.22 | 1.49700 | 81.54 |
| 15 | −81.0686 | 0.07 | | |
| 16 | 82.6603 | 9.83 | 1.58650 | 62.33 |
| 17 | −83.9300 | 1.48 | | |
| 18 | 33.2678 | 4.45 | 1.84666 | 23.78 |
| 19 | 18.9623 | 4.89 | | |
| 20 | −45.3174 | 2.27 | 1.49700 | 81.54 |
| 21 | 43.2152 | 3.10 | | |
| 22 | 36.4700 | 4.23 | 1.80440 | 39.59 |
| 23 | −100.2112 | 21.12 | | |
| 24 | ∞ | 1.70 | 1.51633 | 64.14 |
| 25 | ∞ | 3.73 | | |

TABLE 6

Example 3: Other Data

| | |
|---|---|
| f | 100.00 |
| Bf | 25.97 |
| FNo. | 1.90 |
| 2ω (°) | 13.4 |

Example 4

Figure 8:
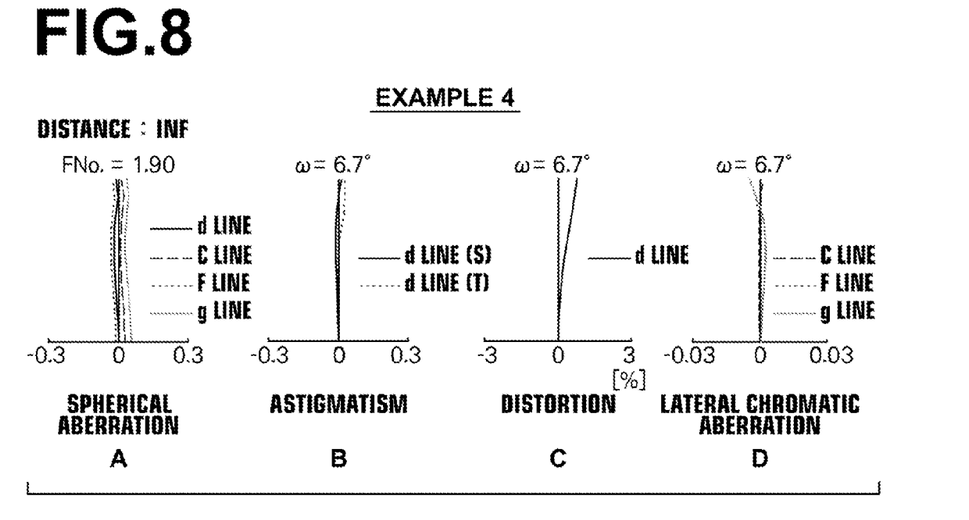

The arrangement of lens groups in the imaging lens of Example 4 is illustrated in FIG. 4. The imaging lens of Example 4 has substantially the same configuration as the imaging lens of Example 1 described above. Table 7 shows basic lens data of the imaging lens of Example 4. Table 8 shows various other data of the imaging lens of Example 4. A through D of FIG. 8 are diagrams that illustrate various aberrations of the imaging lens of Example 4.

TABLE 7

Example 4: Basic Lens Data

| Si | Ri | Di | ndj | vdj |
|---|---|---|---|---|
| 1 | 57.1746 | 9.42 | 1.58913 | 61.14 |
| 2 | −457.7296 | 1.09 | | |
| 3 | 50.8196 | 9.15 | 1.49700 | 81.54 |
| 4 | −155.1633 | 2.23 | 1.72916 | 54.68 |
| 5 | 96.4373 | 2.25 | | |
| 6 | 287.2067 | 2.24 | 1.51742 | 52.15 |
| 7 | 24.2107 | 8.42 | 1.49700 | 81.54 |
| 8 | 122.6312 | 0.07 | | |
| 9 | 30.9571 | 2.23 | 1.51742 | 52.15 |
| 10 | 22.3594 | 7.48 | | |
| 11 (stop) | ∞ | 5.89 | | |
| 12 | −44.1057 | 2.24 | 1.48749 | 70.45 |
| 13 | 18.6887 | 8.99 | 1.49700 | 81.54 |
| 14 | −66.0952 | 0.07 | | |
| 15 | 71.8082 | 10.47 | 1.58913 | 61.14 |
| 16 | −105.3220 | 2.97 | | |
| 17 | 33.8537 | 3.71 | 1.92286 | 20.88 |
| 18 | 20.4058 | 4.47 | | |
| 19 | −43.7766 | 1.48 | 1.43875 | 94.93 |
| 20 | 35.5191 | 3.37 | | |

TABLE 7-continued

Example 4: Basic Lens Data

| Si | Ri | Di | ndj | vdj |
|----|----|----|-----|-----|
| 21 | 35.5120 | 4.10 | 1.80440 | 39.59 |
| 22 | −105.6842 | 21.13 | | |
| 23 | ∞ | 1.71 | 1.51633 | 64.14 |
| 24 | ∞ | 3.67 | | |

TABLE 8

Example 4: Other Data

| f | 100.00 |
|---|--------|
| Bf | 25.93 |
| FNo. | 1.90 |
| 2ω (°) | 13.4 |

In addition, Table 9 shows the values corresponding to the conditions defined in Conditional Formulae (1) through (6), that is, the values of the text portions, for each of Examples 1 through 4. These values are related to the d line. As shown in Table 9, the imaging lenses of Examples 1 through 4 satisfy all of Conditional Formulae (1) through (6). Further, the imaging lenses of Examples 1 through 4 satisfy all of Conditional Formulae (1-1) through (6-1), which are more preferable ranges within the ranges defined in Conditional Formulae (1) through (6).

TABLE 9

| Formula | Condition | Example 1 | Example 2 | Example 3 | Example 4 |
|---------|-----------|-----------|-----------|-----------|-----------|
| (1) | f12/f | 0.75 | 0.81 | 0.76 | 0.78 |
| (2) | f1/f2 | 1.97 | 1.18 | 1.28 | 1.48 |
| (3) | (R3mf − R3mr)/(R3mf + R3mr) | 0.32 | 0.23 | 0.27 | 0.25 |
| (4) | (R1mf − R1mr)/(R1mf + R1mr) | 0.20 | 0.16 | 0.17 | 0.16 |
| (5) | R2pf/D2p | 2.62 | 2.08 | 2.61 | 2.08 |
| (6) | nd3n | 1.44 | 1.50 | 1.50 | 1.44 |

As can be understood from the numerical data and the diagrams that illustrate the aberrations, each of the Examples realizes a bright imaging lens having an F number of approximately 1.9, in which various aberrations are favorably corrected.

Note that FIG. 1 illustrates an example in which the optical member PP is provided between the lens system and the image formation plane Sim. Alternatively, various filters may be provided among the lenses instead of providing various filters such as a low pass filter and a filter that cuts off specific wavelength bands. As a further alternative, coatings that have the same functions as the various filters may be administered on the surfaces of the lenses.

Figure 9:
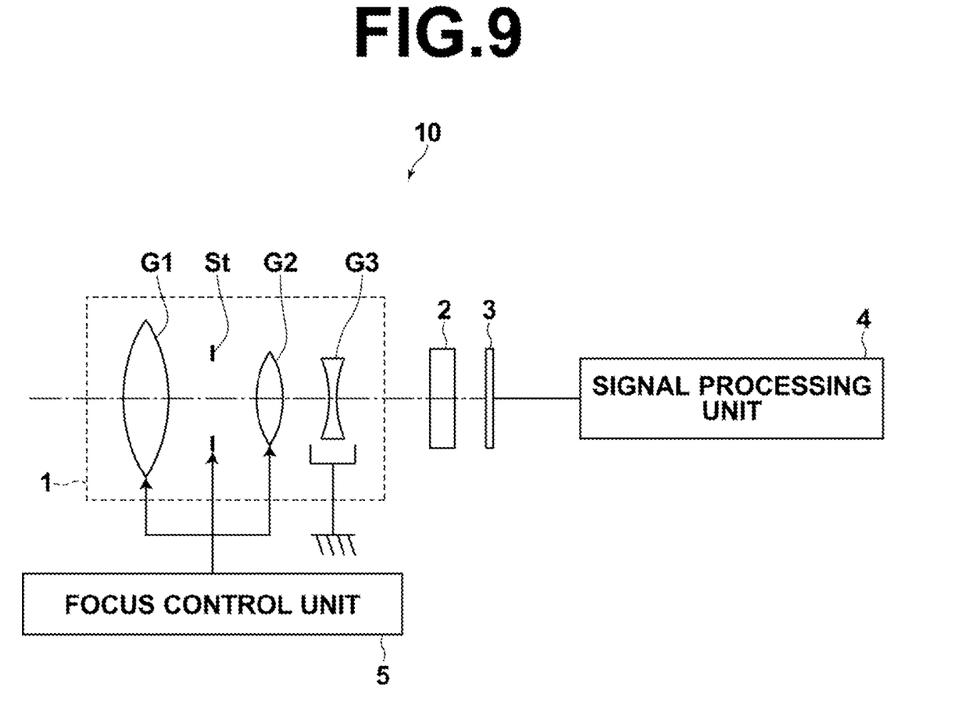
FIG. 9 is a schematic diagram that illustrates the configuration of an imaging apparatus according to an embodiment of the present invention.

Next, an imaging apparatus according to an embodiment of the present invention will be described. FIG. 9 is a schematic diagram that illustrates the configuration of an imaging apparatus 10 equipped with an imaging lens 1 according to an embodiment of the present invention as an example of an imaging apparatus according to the embodiment of the present invention. Examples of this imaging apparatus include electronic cameras, such as digital cameras, surveillance cameras, and cinematic cameras.

The imaging apparatus 10 illustrated in FIG. 9 is equipped with the imaging lens 1, a filter 2, provided toward the image side of the imaging lens 1, an imaging element 3 that captures images of subjects formed by the imaging lens 1, a signal processing unit 4 that performs calculation processes on signals output from the imaging element 3, and a focus control unit 5 for performing focus adjustments.

The imaging lens 1 has a positive first lens group G1, a stop St, a positive second lens group G2, and a negative third lens group G3. The first lens group G1, the stop St, and the second lens group G2 are moved integrally along the optical axis by the focus control unit 5 to perform focusing operations. The third lens group G3 is fixed during focusing operations. Note that each of the lens groups are schematically illustrated in FIG. 9. The imaging element 3 captures optical images formed by the imaging lens 1 and outputs electrical signals. The imaging element 3 is provided such that the imaging surface thereof is positioned at the image formation plane of the imaging lens 1. A CCD, a CMOS, or the like may be employed as the imaging element 3.

The imaging lens according to the embodiment of the present invention has the advantages described above. Therefore, the imaging apparatus 10 can be configured to be compact at low cost, and is capable of obtaining bright, favorable images.

The present invention has been described in connection with the embodiments and the Examples. However, the present invention is not limited to the embodiments and Examples described above, and various modifications are possible. For example, the values of the radii of curvature, the distances among surfaces, the refractive indices, the Abbe's numbers, etc., of each lens component are not limited to the numerical values indicated in connection with the Examples, and may be other values.

What is claimed is:

1. An imaging lens consisting of in order from an object side to an image side:
    a first lens group;
    a stop;
    a second lens group having a positive refractive power; and
    a third lens group having a negative refractive power which is fixed during focusing operations,
    the first lens group consisting of, in order from the object side to the image side, at least one lens having a positive refractive power, at least one cemented lens, and a negative meniscus lens having a concave surface toward the image side,
    the second lens group consisting of, in order from the object side to the image side, a cemented lens formed by a biconcave lens and a biconvex lens, and a biconvex lens,
    the third lens group consisting of, in order from the object side to the image side, a negative meniscus lens having a convex surface toward the object side, a biconcave lens, and a biconvex lens,
    the first lens group, the stop, and the second lens group being moved integrally along an optical axis to perform focusing from an infinite distance to a finite distance.

2. An imaging lens as defined in claim 1 that satisfies Conditional Formula (1) below:

$$0.65 < f12/f < 0.90 \quad (1)$$

wherein f12 is the combined focal length of the first lens group and the second lens group, and f is the focal length of the entire system.

3. An imaging lens as defined in claim 1 that satisfies Conditional Formula (2) below:

$$1.00 < f1/f2 < 2.50 \quad (2)$$

wherein f1 is the focal length of the first lens group, and f2 is the focal length of the second lens group.

4. An imaging lens as defined in claim 1 that satisfies Conditional Formula (3) below:

$$0.15 < (R3mf - R3mr)/(R3mf + R3mr) < 0.50 \qquad (3)$$

wherein R3mf is the radius of curvature of the surface of the negative meniscus lens within the third lens group toward the object side, and R3mr is the radius of curvature of the surface of the negative meniscus lens within the third lens group toward the image side.

5. An imaging lens as defined in claim 1 that satisfies Conditional Formula (4) below:

$$0.10 < (R1mf - R1mr)/(R1mf + R1mr) < 0.30 \qquad (4)$$

wherein R1mf is the radius of curvature of the surface of the negative meniscus lens within the first lens group toward the object side, and R1mr is the radius of curvature of the surface of the negative meniscus lens within the first lens group toward the image side.

6. An imaging lens as defined in claim 1, wherein:
a cemented lens formed by a lens having a negative refractive power and a concave surface toward the image side and a lens having a positive refractive power and a convex surface toward the object side is positioned at the object side of the negative meniscus lens within the first lens group with an air interval therebetween.

7. An imaging lens as defined in claim 1 that satisfies Conditional Formula (5) below:

$$1.0 < R2pf/D2p < 3.5 \qquad (5)$$

wherein R2pf is the radius of curvature of the surface of the biconvex lens that constitutes the cemented lens within the second lens group toward the object side, and D2p is the thickness of the center of the biconvex lens that constitutes the cemented lens within the second lens group.

8. An imaging lens as defined in claim 1 that satisfies Conditional Formula (6) below:

$$nd3n < 1.60 \qquad (6)$$

wherein nd3n is the refractive index of the biconcave lens within the third lens group with respect to the d line.

9. An imaging lens as defined in claim 2 that satisfies Conditional Formula (1-1) below:

$$0.72 < f12/f < 0.85 \qquad (1\text{-}1)$$

wherein f12 is the combined focal length of the first lens group and the second lens group, and f is the focal length of the entire system.

10. An imaging lens as defined in claim 3 that satisfies Conditional Formula (2-1) below:

$$1.15 < f1/f2 < 2.10 \qquad (2\text{-}1)$$

wherein f1 is the focal length of the first lens group, and f2 is the focal length of the second lens group.

11. An imaging lens as defined in claim 4 that satisfies Conditional Formula (3-1) below:

$$0.20 < (R3mf - R3mr)/(R3mf + R3mr) < 0.36 \qquad (3\text{-}1)$$

wherein R3mf is the radius of curvature of the surface of the negative meniscus lens within the third lens group toward the object side, and R3mr is the radius of curvature of the surface of the negative meniscus lens within the third lens group toward the image side.

12. An imaging lens as defined in claim 5 that satisfies Conditional Formula (4-1) below:

$$0.14 < (R1mf - R1mr)/(R1mf + R1mr) < 0.23 \qquad (4\text{-}1)$$

wherein R1mf is the radius of curvature of the surface of the negative meniscus lens within the first lens group toward the object side, and R1mr is the radius of curvature of the surface of the negative meniscus lens within the first lens group toward the image side.

13. An imaging lens as defined in claim 7 that satisfies Conditional Formula (5-1) below:

$$1.6 < R2pf/D2p < 2.8 \qquad (5\text{-}1)$$

wherein R2pf is the radius of curvature of the surface of the biconvex lens that constitutes the cemented lens within the second lens group toward the object side, and D2p is the thickness of the center of the biconvex lens that constitutes the cemented lens within the second lens group.

14. An imaging lens as defined in claim 8 that satisfies Conditional Formula (6-1) below:

$$nd3n < 1.53 \qquad (6\text{-}1)$$

wherein nd3n is the refractive index of the biconcave lens within the third lens group with respect to the d line.

15. An imaging apparatus on which the imaging lens defined in claim 1 is mounted.

* * * * *